April 7, 1970 C. ACHENER 3,505,172
STILL WITH CONCENTRIC CONDENSER AND INFRARED SOURCE
Filed July 27, 1967 3 Sheets-Sheet 1

INVENTOR.
CLAUDE ACHENER
BY
Kenway, Jenney + Hildreth
ATTORNEYS

April 7, 1970  C. ACHENER  3,505,172
STILL WITH CONCENTRIC CONDENSER AND INFRARED SOURCE
Filed July 27, 1967  3 Sheets-Sheet 2

INVENTOR.
CLAUDE ACHENER
BY
ATTORNEYS

United States Patent Office 3,505,172
Patented Apr. 7, 1970

3,505,172
STILL WITH CONCENTRIC CONDENSER AND INFRARED SOURCE
Claude Achener, Paris, France, assignor to Quartz & Silice, S.A., Paris, France, a corporation of France
Filed July 27, 1967, Ser. No. 656,469
Claims priority, application France, Aug. 1, 1966, 71,623; Dec. 1, 1966, 85,794
Int. Cl. B01d 3/00
U.S. Cl. 202—187                    11 Claims

ABSTRACT OF THE DISCLOSURE

There is provided distilling apparatus for the production of very highly purified distillate, in which a thin film of liquid is caused to flow uniformly along a thin walled porous sleeve against which is directed infrared radiation causing evaporation of the liquid film without boiling, and a cooled condensing surface is disposed on the side of the sleeve opposite from the infrared source.

---

This invention relates to distilling apparatus capable of producing liquids of exceptionally high purity such, for example, as distilled water useful in pharmacology.

In conventional distilling it is customary to evaporate the liquid by boiling it and then condense the vapor. However, it is inevitable that in the process of boiling the liquid very small droplets of the liquid will be entrained in the vapor and carried over into the condensate; these droplets carry with them the various impurities present in the starting liquid. Although the amounts of impurities thus carried over into the distillate are relatively small, they cannot be tolerated in a liquid such as distilled water destined, for example, to be combined with other material and injected into the human body.

In French Patent No. 1,198,154 filed June, 1958, by Société Pour l'Application de Hautes Températures Quartex there is disclosed distilling apparatus in which an infrared radiator is placed in position to direct radiation upon the surface of a body of liquid; in that system the liquid is evaporated without boiling, and the entrainment of droplets of the starting liquid is thus avoided. Apparatus of that sort is effective but suffers two disadvantages. Its thermal efficiency is only about 40%, and the rate of production of distilled water in apparatus small enough to be useful in the ordinary laboratory is at the rate of only one or two liters per hour.

The primary object of this invention is to provide distilling apparatus which operates at relatively high efficiency and produces distillate at a relatively high rate.

The most important feature of the invention comprises the combination of a thin porous sleeve over which flows a continuous thin film of liquid, the sleeve being concentric with a source of infrared radiation and positioned between the source of radiation and a refrigerated condenser wall, or coil. The sleeve is preferably in the form of a seamless web of pure transparent silica, a substance which is not only completely transparent to infrared radiation, but is practically insoluble in water. On the other hand, a film of water absorbs practically all infrared radiation reaching it. In operation the apparatus of my invention produces rapid evaporation of the water from both surfaces of the film; in apparatus of suitable size the rate of distillate production can be in the order of 10 to 15 liters per hour, and the thermal efficiency is at least as high as 80%.

Figure 1:
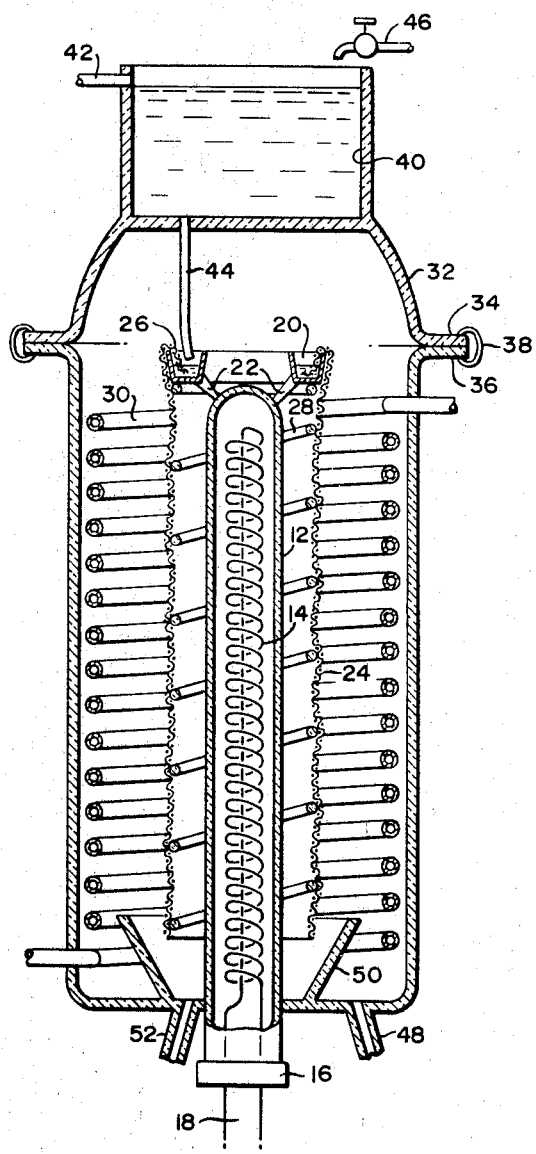
Figure 2:
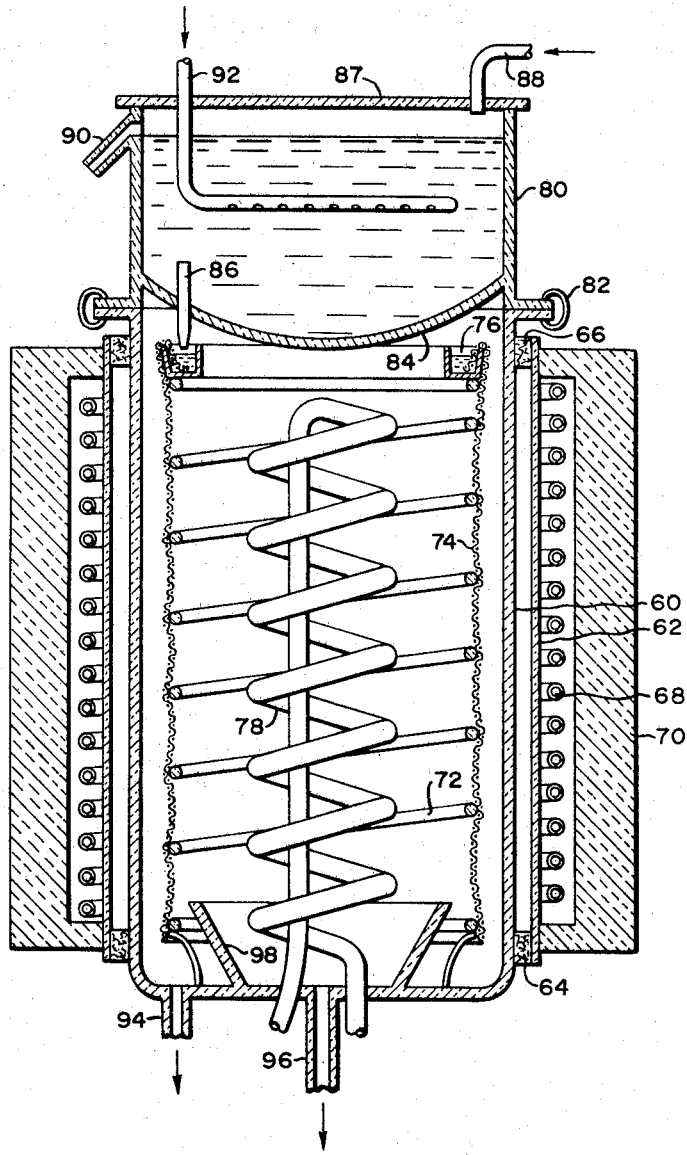
Figure 3:
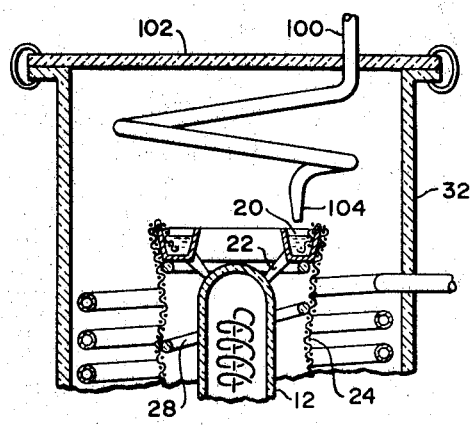
Figure 4:
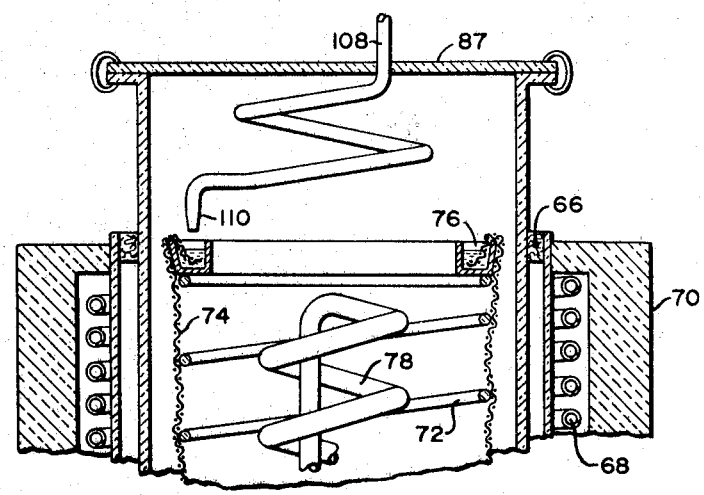

These and other objects and features of the invention will be more readily understood and appreciated from the following detailed description of preferred embodiments thereof selected for purposes of illustration and shown in the accompanying drawings, in which:

FIG. 1 is a rather diagrammatic view in cross-section through a still constructed in accordance with the invention, FIG. 2 is a diagrammatic view in cross-section of a still constructed in accordance with another embodiment of the invention, FIG. 3 is a view in cross-section through a modification of the apparatus shown in FIG. 1, and FIG. 4 is a view in cross-section of a modification of the apparatus shown in FIG. 2.

Referring now to FIG. 1, it will be seen that the still is organized about a tubular casing preferably made of pure transparent silica. Mounted (by means not shown) in the longitudinal axis of the casing 10 is a coil 14 of resistance wire, the coil being housed in a tube 12, preferably also of pure transparent silica, closed at its upper end and provided at its bottom with a base 16 through which the lead wires 18 pass for connection to a suitable source of current. When it is desired to distill water, the temperature of the coil 14 is adjusted to be between 1000° C. and 1100° C. The casing 10, the coil 14 and the tube 12 are disposed in vertical positions, and an annular trough or gutter 20 is provided with struts which rest on the closed end of the tube 12.

Surrounding the tube 12 for most of its length is a sleeve 24. The sleeve is preferably composed of filaments of pure transparent silica, woven or felted to a thickness of from .3 to .4 of a millimeter, and the upper end 26 of the sleeve is folded over to dip into the annular trough 20. Although filamentary pure transparent silica is the preferred material, because of its transparency to infra-red radiation and its insolubility, the sleeve can be made of other materials such as glass fibers. Alternatively the sleeve may be in the form of a thin walled tube of porous graphite or carbon, porous alumina, porous silica, or similar ceramic products, or of a fritted material, such as metals resistant to water corrosion. The efficiency of apparatus made with such other materials is inferior to that obtained with a sleeve of transparent pure silica because the other materials are more or less absorptive of infrared radiation.

A coil 28, preferably also of pure transparent silica, fits snuggly within the flexible sleeve 24 and provides support therefor. It is most important that liquid which is drawn by capillary action from the annular trough into the upper end 26 of the sleeve be uniformly distributed over the surface of the sleeve. If the sleeve is not of uniform thickness or if there are irregularities in the surface, there will be poor distribution of the liquid, the result being the establishment of rivulets which run rapidly down the sleeve and merely waste the starting liquid. If, for example, the tube should have a seam, there would almost inevitably be established such a rivulet along the seam. The helical form of the sleeve support is an important feature of the invention since it fosters uniform distribution of the liquid film. If the sleeve were to be supported by a structure including solid vertical elements, those elements would also cause the establishment of wasteful rivulets. Uniform distribution of the film on the sleeve is important. Otherwise there would be portions of the sleeve on which the liquid would pass too rapidly from top to bottom without evaporating, and there would be other parts of the sleeve which would dry out, the result being that the radiation reaching the dried portions of the sleeve would be wasted. The helical support eliminates every direct trajectory running vertically from the top to the bottom.

I have found that a sleeve thickness of from .3 to .4 of a millimeter is optimum. If the sleeve were thinner, the amount of liquid taken from the trough by capillarity would be too small to maintain a liquid film throughout the length of the sleeve, the bottom would dry out and again waste the energy passing through it. On the other hand, if the sleeve were made too thick, the amount of liquid drawn upon the sleeve would be so great that much of it would not be evaporated.

Surrounding the sleeve is a coil of tubing 30 provided with inlet and outlet conduits so that a refrigerating medium may be continuously circulated.

At its upper end the casing 10 terminates in an annular flange 36, the upper surface of which is ground flat so that it will mate with a similar flange 34 disposed at the bottom of a cover member 32. An annular rubber clamp 38 serves to hold the flanges firmly in engagement. In the upper portion of the cover member 32 there is an integral reservoir 40 provided with an overflow outlet 42 and a downwardly extending discharge tube 44 leading into the trough 20, the reservoir being disposed beneath a valve controlled nozzle 46 through which the starting liquid is introduced. In the case of water it will be found useful first to pass the water through an ion exchanger or other demineralizing apparatus so that the sleeve and other parts will not be subject to the deposition of salts.

At the bottom of the casing 10 there is an outlet 48 disposed beneath the condenser coil 30, and a second outlet 52 disposed beneath the lower end of the sleeve 24; a funnel-shaped baffle is formed integrally with the bottom of the casing and serves to prevent mingling of the distillate with the excess impure water dripping from the bottom of the sleeve 24.

The dimensions of the reservoir 40 and its discharge tube 44 are arranged to provide a supply of liquid to the trough 20 at a rate commensurate with that at which the liquid is drawn by capillarity onto the sleeve 24.

By way of example, I have obtained excellent results with apparatus in which the sleeve has a diameter of 100 millimeters and a length of 500 millimeters. The cooling coil has an internal diameter of 3 millimeters and an outside diameter of 4.5 millimeters, the tubing being coiled on a diameter of 130 millimeters. In that connection it should be noted that it is preferable to space the turns closely together, about 2 millimeters apart. If there is is too great a spacing between the turns, drops falling from one turn to the next cause splashing and some of the distilled liquid will splash back onto the sleeve or fall into the inside of the funnel-shaped baffle 50, thus creating a considerable loss of distillate.

The energy dissipated by the heating coil 14 is in the order of 12 kilowatts, most of which is in the form of infrared radiation at a wavelength of 2.7 microns which happens to be the value at which water is most absorptive. At 2.7 microns a film of water some tenths of a millimeter thick will absorb 99% of the infrared energy it receives. The absorption by water is also very great in the wavelengths bordening on 2.7 microns. Hence it is fair to say that practically all of the radiation being emitted is absorbed by the water. The result is that apparatus of the type shown will operate at about 80% of theoretical efficiency.

The arrangement shown in FIG. 1 provides an annular chimney space between the tube 12 and the surface of the sleeve 24. Consequently water vapor evaporating from the sleeve is drawn upwardly by convection toward the top of the apparatus; then the cold condenser coil brings about a reverse chimney effect, the vapor descends along the length of the condenser coil and becomes liquid before reaching the bottom of the casing 10.

In FIG. 2 there is shown an alternative structure incorporating the same principles of operation. In this embodiment of the invention the structure is organized about a tubular casing 60 preferably constructed of pure transparent silica. Surrounding the casing 60 is a muffle furnace including a tubular muffle 62, also preferably of pure transparent silica. The muffle 62 is spaced from the exterior wall of the casing 60, and at the top and bottom the space is closed by annular members 64 and 66 of thermal insulating material such as silica wool or asbestos. An electric resistance heating coil 68 is wound about the muffle 62, and the whole is encased in a substantially thick wall 70 of any suitable thermal insulating material.

Mounted within the casing 60 is a helical support member 72 over which is stretched a thin walled flexible porous sleeve 74 preferably constructed as a web of filaments of glass or pure transparent silica, although other forms may be employed as explained in connection with the discussion of the sleeve 24 in FIG. 1. Mounted at the top of the helical support 72 is an annular trough 76 into which the upper end of the sleeve dips so that liquid in the trough 76 will be drawn onto the sleeve 74 to form a downwardly flowing thin film of liquid spread uniformly along the sleeve. Supported from the bottom of the casing 10 is a refrigerated condenser coil 78 mounted coaxially with the sleeve 74, the casing 60, and the muffle 62.

A reservoir 80 is disposed above the annular trough 76 and is clamped to the upper end of the casing 60, the casing and the reservior being provided with mating annular flanges held in place by an annular resilient clamp member 82. The bottom wall 84 of the reservoir 80 is concave so that liquid vapors condensing on its lower surface will flow inwardly to the center and drop down along the condenser coil 78. A tube 86 leads from the interior of the reservoir 80 into the annular trough 76, the tube 86 terminating in the nozzle dimensioned to provide a continuous stream of liquid running into the trough at a predetermined rate. The reservoir 80 is a constant-level device, being provided with an overflow tube 90. The reservoir also has an integral cover 87 through which passes an inlet pipe 88 and another pipe 92 terminating in a horizontal portion provided with apertures. Nitrogen may be introduced through the pipe 92 and bubbled through the liquid in the reservoir in order to provide a nitrogen atmosphere above the surface of the liquid in the reservoir and thus minimize the presence of dissolved carbon dioxide in the liquid.

The bottom wall of the casing 60 is provided with a discharge drain tube 94 disposed beneath the surface of the sleeve 74 and with a centrally located drain pipe 96. A funnel-shaped baffle 98 serves to separate the distillate from the excess liquid dripping from the bottom of the sleeve 74.

When the coil 68 is energized, infrared energy is directed inwardly, passing through the muffle 62 and the casing 60, both of which are almost entirely transparent to infrared energy. However, the liquid film on the surface of the sleeve absorbs almost all of the energy reaching it and therefore evaporates, without boiling. The space between the wall of the casing 60 and the sleeve 74 provides an annular chimney so that the liquid vapors are carried upwardly until they come in contact with the concave bottom 84 of the reservoir and are then drawn inwardly and re-descend along the length of the condensener coil 78.

In this arrangement it is important to note that the reservoir 80 is heated by the hot vapor, and an important result is thereby achieved. One of the difficulties encountered in the production of very highly purified water is the presence of dissolved carbon dioxide. A liter of water at 16° C. will contain as much as 2 grams of dissolved carbon dioxide, but when the temperature is raised to 60° C., only .6 gram of dissolved carbon dioxide will be present (assuming in both cases that the water is under a pressure of 760 millimeters of mercury). Hence the preheating of the water in the reservoir greatly reduces the amount of $CO_2$ present. To still further minimize the presence of dissolved $CO_2$, I may bubble nitrogen into the liquid in the reservoir in order to maintain a nitrogen atmosphere above the surface of the liquid and thereby prevent it from coming into contact with the air.

It should also be noted that the heating of the liquid in the reservoir raises the temperature of the liquid reaching the trough and the porous sleeve, thereby greatly increasing the thermal efficiency of the apparatus. Incidentally when the condensing coil is located in the axis of the casing, as in FIG. 2, the bottom wall of the reservoir is, as has been explained, advantageously concave in order to direct condensed liquid toward the center of the apparatus. When the condensing coil is adjacent the periphery of the casing, as in FIG. 1, it is advantageous to make the bottom wall of the reservoir convex, so that liquid condensing on the lower surface of the bottom wall will flow outwardly and drip down along the length of the condensing coil.

If the starting liquid has been subjected to a prior purifying step, as, for example, passage through an ion exchanger or other demineralizing device, it is not necessary to use a constant level reservoir. The output from such purifying apparatus is reliably constant. Hence a liquid may be introduced into the top of the distilling apparatus through a conduit which has one or more turns, providing a path long enough to ensure the preheating of the liquid. In FIG. 3 I have illustrated a liquid supply system applicable to the embodiment of FIG. 1. Instead of the reservoir, I provide a cover 102 for the top of the member 32 and a conduit 100 which passes through the cover 102 and makes a complete turn before terminating in a nozzle 104 disposed over the trough 20. While I have shown only one turn in FIG. 3, it will be understood that the conduit 100 may have as many turns as is desirable to provide proper pre-heating of the starting liquid. Inasmuch as the liquid does not come in contact with air or $CO_2$ before being treated, it is not necessary to provide means for bubbling nitrogen through it.

In FIG. 4 I have shown a similar arrangement adapted for use with the muffle furnace type of apparatus illustrated in FIG. 2. Here a pipe 108 passes through a cover member 66, makes one or more turns, and terminates in a nozzle 110 disposed in position over the trough 76.

It will be observed that in both embodiments of the invention the starting liquid is made to flow down along a porous sleeve and the flowing film exposed to caloric energy which causes evaporation from both surfaces of the film; no boiling takes place, and therefore no microdroplets are entrained in the liquid vapor. The sleeve is disposed between the heat source and a refrigerated wall. While I have shown a refrigerated condensing coil, it will be understood that other cooled surfaces could be substituted. For example, in the embodiment of FIG. 1 the coil 30 could be eliminated and a jacket provided about the casing 10 in order to cool its wall. However, the coil is more efficient because of the poor heat conduction exhibited by silica.

The embodiments of the invention have largely been described in terms of distillation of extremely pure water. However, the invention is by no means limited to the distillation of water. It is particularly adapted for the distillation of any liquid which is highly absorptive of infrared energy such, for example, as xylene, dioxane, hexone, acetylacetone, and formic and acetic acids. Differences in the boiling points of various such liquids would dictate obvious changes in temperature and flow rates, but the overall functioning of the apparatus would be on the same principles that have been discussed above.

Having thus described and illustrated two embodiments of my invention, what I claim as new and desire to secure by Letters Patent is:

1. Apparatus for distilling a liquid which is substantially absorbent of infrared radiation, said apparatus comprising:
   a generally cylindrical source of infrared radiation;
   means defining a generally cylindrical condensation surface which faces and is substantially coaxial with said source;
   a porous, generally cylindrical sleeve of a material which is substantially transparent to said infrared radiation;
   means for supporting said sleeve between said source and said condensation surface and holding said sleeve spaced apart from said infrared source and said condensation surface and substantially concentric therewith; and
   means for providing a flow of said liquid in a thin film downwardly over said sleeve, said flow being spaced apart from said source, whereby the film of liquid on said sleeve is selectively heated by absorption of infrared radiation from said source, is evaporated without boiling, and is condensed on said condensation surface.

2. Apparatus for distilling a liquid which is highly absorptive of infrared radiation, said apparatus comprising:
   a generally cylindrical source of infrared radiation;
   means defining a generally cylindrical condensation surface which faces and is substantially coaxial with said source;
   a porous, generally cylindrical sleeve comprising a mesh of filaments of a material which is substantially transparent to said infrared radition;
   means for supporting said sleeve between said source and said condensation surface and holding said sleeve spaced apart from said infrared source and said condensation surface and substantially concentric therewith; and
   means for providing a flow of said liquid in a thin convoluted film over said filaments, said flow being spaced apart from said source, whereby the film of liquid on said filaments is selectively heated by absorption of infrared radiation from said source, is evaporated without boiling, and is condensed on said condensation surface.

3. Apparatus as set forth in claim 2 wherein said source, said sleeve and said condensation surface are vertically oriented and wherein said means for providing a flow of liquid includes an annular trough for said liquid at the upper end of said sleeve.

4. Apparatus as set forth in claim 3 wherein the upper end of said sleeve is immersed in the liquid in said trough thereby to provide said film of liquid by capillary action.

5. Apparatus as set forth in claim 2 including a helical member constructed of a material which is substantially transparent to said infrared radiation for supporting said sleeve and distributing the flow of said liquid thereon.

6. Apparatus as set forth in claim 2 wherein said filaments are pure transparent silica.

7. Apparatus as set forth in claim 6 wherein said source comprises a coil of resistance wire and a surrounding tube of pure transparent silica inside of said sleeve.

8. Apparatus as set forth in claim 6 wherein said source comprises a muffle furnace outside of said sleeve.

9. Distilling apparatus comprising a tubular muffle furnace in vertical disposition, a porous sleeve disposed vertically within said furnace, a refrigerated coil disposed co-axially within said sleeve, an annular trough disposed above said sleeve, the upper end of the sleeve dipping into said trough, and means for supplying liquid to said trough wherein a helical support is provided for said sleeve.

10. Distilling apparatus comprising a tubular muffle furnace in vertical disposition, a thin-walled porous sleeve of fritted material disposed vertically within said furnace, a refrigerated coil disposed co-axially within said sleeve, an annular trough disposed above said sleeve, the upper end of the sleeve dipping into said trough, and means for supplying liquid to said trough.

11. Distilling apparatus comprising a tubular muffle furnace in vertical disposition, a porous sleeve of filamentary pure transparent silica disposed vertically within said furnace, a refrigerated coil disposed co-axially within said sleeve, an annular trough disposed above said sleeve, the upper end of the sleeve dipping into said trough, and means for supplying liquid to said trough.

References Cited

UNITED STATES PATENTS

| | | | |
|---|---|---|---|
| 1,893,340 | 1/1933 | Schlumbohm | 203—86 X |
| 2,129,596 | 9/1938 | Waterman et al. | 203—89 X |
| 2,224,621 | 12/1940 | Voorhees | 203—89 |
| 2,310,399 | 2/1943 | Cox et al. | 203—87 |
| 2,642,386 | 6/1953 | Piros | 202—235 |
| 2,837,469 | 6/1958 | Mohn | 203—10 |
| 3,004,901 | 10/1961 | Nerge et al. | 203—89 |
| 3,091,577 | 5/1963 | Pequignot | 202—189 |
| 3,161,574 | 12/1964 | Elam | 203—11 X |
| 3,163,587 | 12/1964 | Champe | 202—176 |
| 3,250,687 | 5/1966 | Frank | 202—205 |
| 2,744,629 | 5/1956 | Vine | 210—1 |
| 2,953,457 | 9/1960 | Sanna | 99—56 X |
| 2,455,059 | 11/1948 | Hickman | 202—205 |

FOREIGN PATENTS

| | | |
|---|---|---|
| 422,941 | 1/1935 | Great Britain. |
| 962,332 | 7/1949 | Germany. |

NORMAN YUDKOFF, Primary Examiner

F. E. DRUMMOND, Assistant Examiner

U.S. Cl. X.R.

202—196, 236; 203—10